US007440760B2

(12) United States Patent
Valenzuela

(10) Patent No.: US 7,440,760 B2
(45) Date of Patent: Oct. 21, 2008

(54) METHODS AND APPARATUS FOR ALLOCATING BANDWIDTH TO COMMUNICATION DEVICES BASED ON SIGNAL CONDITIONS EXPERIENCED BY THE COMMUNICATION DEVICES

(75) Inventor: Reinaldo A. Valenzuela, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 891 days.

(21) Appl. No.: 10/403,729

(22) Filed: Mar. 31, 2003

(65) Prior Publication Data

US 2004/0192323 A1 Sep. 30, 2004

(51) Int. Cl.
*H04Q 7/20* (2006.01)
*H04Q 7/30* (2006.01)

(52) U.S. Cl. ...................................... 455/452.2; 455/62

(58) Field of Classification Search .............. 455/452.2, 455/452.1, 450, 62
See application file for complete search history.

(56) References Cited

U.S. PATENT DOCUMENTS

| 5,155,862 | A | * | 10/1992 | Hansen ........................ 455/266 |
|---|---|---|---|---|
| 5,594,726 | A | * | 1/1997 | Thompson et al. ........... 370/485 |
| 5,790,587 | A | * | 8/1998 | Smith et al. .................. 375/147 |
| 5,889,766 | A | * | 3/1999 | Ohnishi et al. ............... 370/307 |
| 6,023,622 | A | * | 2/2000 | Plaschke et al. ........... 455/452.2 |
| 6,246,881 | B1 | * | 6/2001 | Parantainen et al. ........ 455/450 |
| 6,778,692 | B1 | * | 8/2004 | Yazici ........................ 382/132 |
| 6,859,443 | B1 | * | 2/2005 | Mushkin ..................... 370/324 |
| 2001/0013801 | A1 | * | 8/2001 | Johnson ...................... 327/157 |
| 2002/0097696 | A1 | * | 7/2002 | Kossi et al. .................. 370/330 |
| 2002/0137520 | A1 | * | 9/2002 | Dillon et al. ................. 455/453 |
| 2002/0142777 | A1 | * | 10/2002 | McGovern et al. .......... 455/450 |
| 2002/0186710 | A1 | * | 12/2002 | Alvesalo et al. ............. 370/468 |
| 2003/0236854 | A1 | * | 12/2003 | Rom et al. ................... 709/217 |
| 2004/0002317 | A1 | * | 1/2004 | Busking ...................... 455/266 |
| 2004/0072571 | A1 | * | 4/2004 | Halonen et al. ............. 455/450 |
| 2004/0127178 | A1 | * | 7/2004 | Kuffner ....................... 455/133 |
| 2005/0128984 | A1 | * | 6/2005 | Yano et al. ................... 370/335 |
| 2005/0130701 | A1 | * | 6/2005 | Zendle ........................ 455/555 |

\* cited by examiner

*Primary Examiner*—Harry S Hong

(57) ABSTRACT

Techniques and systems for allocating bandwidth in a communication channel to devices using the communication channel are described. A communication system includes a central device and one or more remote devices. The central device may transmit information to and receive information from each of the remote devices and each of the remote devices may transmit information to and receive information from the base station. The central device receives information relating to the quality of the communication channel experienced by remote device and adjusts the bandwidth allocated to each remote device based on the communication channel quality experienced by that device. The total frequency range encompassed by the communication channel may also increase or decrease as the average quality of the communication channel for all remote devices increases or decreases. Increasing the frequency range available to a device while maintaining the channel quality allows a directly proportional increase in the communication rate with the device.

19 Claims, 4 Drawing Sheets

METHODS AND APPARATUS FOR ALLOCATING BANDWIDTH TO COMMUNICATION DEVICES BASED ON SIGNAL CONDITIONS EXPERIENCED BY THE COMMUNICATION DEVICES

FIELD OF THE INVENTION

The present invention relates generally to improvements in the field of communications. More particularly, the invention relates to systems and techniques for allocating bandwidth to communication devices based on the quality of the communications channel experienced by the communication devices.

BACKGROUND OF THE INVENTION

Many communication systems employ one or more central communication devices such as base stations, central controllers, cable head ends or the like, with each central device serving a number of remote devices. The remote devices served by a central device may be deployed at varying distances from the central device, and may experience other variations in communication conditions that create differences in the quality of the communication channel. In addition, the remote devices may move from one location to another, moving closer to or farther from the central device, and may otherwise experience changes in conditions that alter the quality of the communication channel experienced by each and alter the relative qualities of the channels experienced by two or more remote devices.

In typical prior art systems, each remote device is allocated a fixed bandwidth. This bandwidth may be defined by a channel filter. Each remote device experiences an increase in signal to noise ratio as it experiences improvements in the communication channel, as may occur if it moves closer to a central device. The improvement in signal to noise ratio allows an increase in transmission rate, which is often achieved by matching the modulation coding technique to the channel conditions experienced by a remote device. When no power control is used, the power and bandwidth of the transmitted signal is held constant and the number of states that the particular modulation format being employed allows for use by the remote station is changed to match the current received signal quality. Allowing more states allows a remote device to encode additional symbols, allowing an increase in the number of bits transmitted.

However, the maximum possible transmission rate increases slowly with signal to noise ratio. The maximum theoretical communication rate of a communication system, expressed in bits per second, is given by the following equation:

$$R = BW * \log_2((S+N)/N), \quad (1)$$

where R+communication rate, BW=bandwidth, S=signal and N=noise. Throughout this discussion, the term "noise" refers to a combination of noise and interference. Thus, the value of the variable "N" includes both noise and interference. It can be seen that the communication rate is proportional to the logarithm of the signal to noise ratio. A doubling of the signal to noise ratio yields only a 1 bit per second increase for each Hertz of bandwidth.

There exists, therefore, a need for improved systems and techniques for adjustments for changes in channel condition which allow greater increases in transmission rates with improvements in channel condition.

SUMMARY OF THE INVENTION

A communication system according to an aspect of the present invention includes a central device and one or more remote devices, such as wireless transceivers, computer network access points, cable television receivers and the like. The central device may transmit information to and receive information from each of the remote devices and each of the remote devices may transmit information to and receive information from the central device. The central device receives information relating to the quality of the communication channel experienced by each of the remote devices and adjusts the bandwidth available to each remote device based on the quality of the communication channel experienced by that device. The frequency range encompassed by the communication channel may also increase or decrease as the average quality of the communication channel for all remote devices increases or decreases.

A remote device in a favorable location, that is, a location in which the device experiences relatively little propagation loss, will be allocated a larger portion of the frequency range available in the communication channel. As can be seen from equation (1) above, this increase in bandwidth allows a directly proportional increase in transmission rate. Adjustments in bandwidth can be achieved by making changes in a receiver filter in the remote device. This receiver filter may be a filter function, implemented as software executed by processing electronics in the remote device. The changes in the receiver filter may be made by sending control signals to the remote device defining the bandwidth in which it is to transmit. The power and bandwidth can be adjusted to maintain a constant signal to noise ratio as the quality of the communication channel changes. The bandwidth adjustments may be advantageously utilized to maintain the transmission rate of each of the remote devices near its optimum level.

A more complete understanding of the present invention, as well as further features and advantages, will be apparent from the following Detailed Description and the accompanying drawings.

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
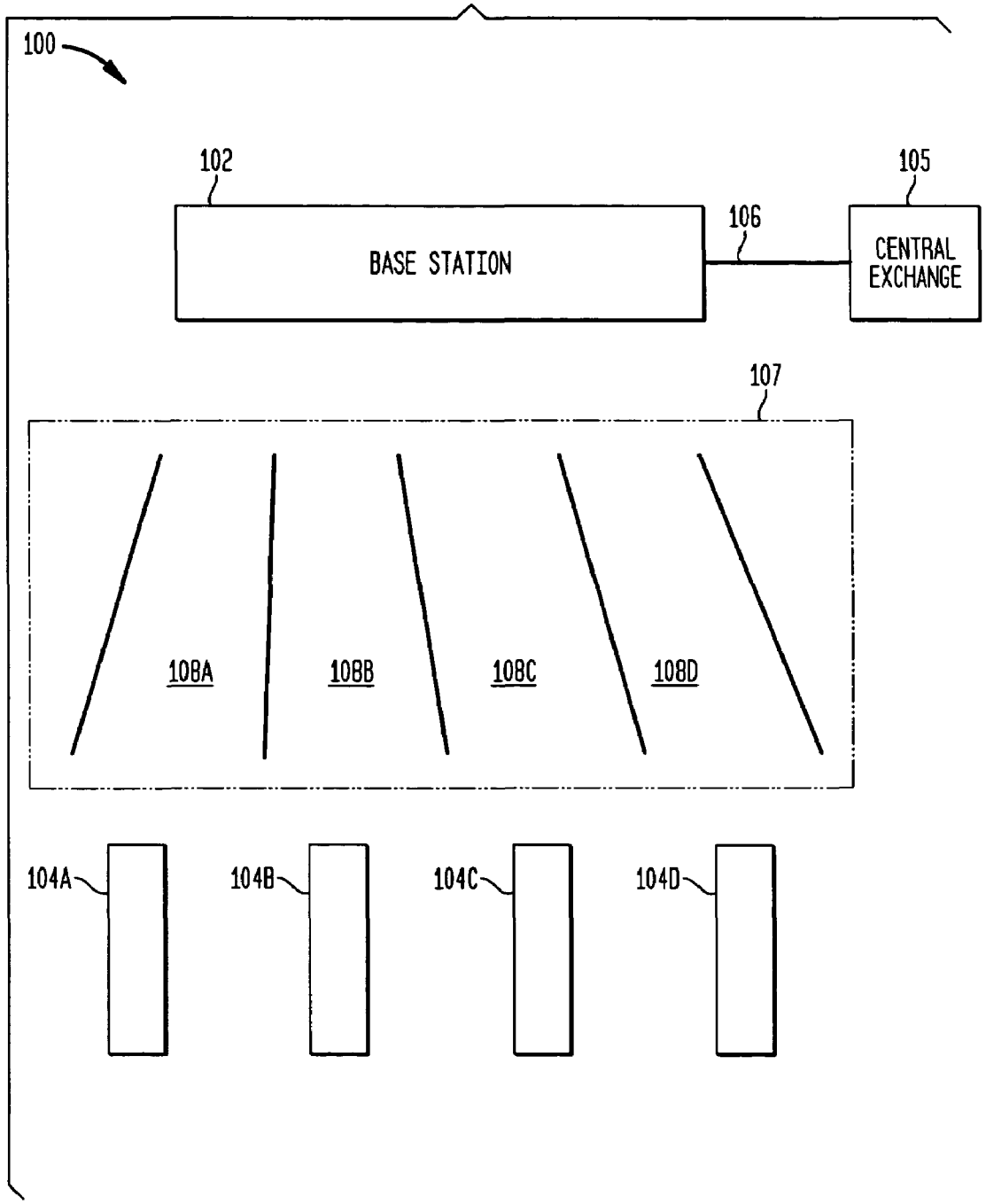
FIG. 1 illustrates a communication system according to an aspect of the present invention.

FIG. 1 illustrates a communication system 100 according to an aspect of the present invention. This exemplary communication system 100 is a wireless telephone system, but it will be recognized that the teachings of the present invention may be applied to numerous techniques for communication of voice, data and other information, for example digital subscriber line (DSL) systems and cable internet and computer systems.

The communication system 100 includes a central device, which in the present exemplary embodiment is a base station 102, and a plurality of remote devices 104A-104D, with the remote devices 104A-104D being wireless telephone transceivers. While only one base station 102 and four transceivers 104A-104D are illustrated here, it will be recognized that similar communication systems may be designed comprising a large number of base stations and a very large number of transceivers, with each base station being able to provide service over a particular geographic area and transceivers being able to move freely between base stations.

The communication system 100 also includes a central exchange 105, which is accessible to the base station 104, suitably by means of a landline connection 106. The central exchange 105 may suitably be connected to a plurality of base stations similar to the base station 102, and to a telephone exchange, in order to allow access by the base station 102 and the transceivers 104A-104D to transceivers, telephones and other devices connected to or communicating with the central exchange 105.

The base station 102 and the remote devices 104A-104D communicate over a communication channel 107. The communication channel 107 comprises a spectrum of possible frequencies over which communication may be carried out. Each of the remote devices 104A-104D is assigned a frequency band 108A-108D, respectively. Each of the frequency bands 108A-108D occupies a portion of the communication channel 107, with the frequency bands 108A-108D together preferably occupying the entire channel 107.

The quality of the communication channel 107 experienced by each of the remote devices 104A-104D is subject to change, for example, due to changes in distance between each of the devices 104A-104D as the devices move from one location to another, and as devices start and stop transmission, thereby increasing or decreasing the interference experienced by the other devices. The base station 102 detects the quality of the channel experienced by each of the devices 104A-104D, suitably by receiving a signal or message from a device indicating the quality of the channel, or by detecting the degree of propagation loss present in signals transmitted to or received from each of the devices 104A-104D. The base station 102 adjusts the bandwidth provided in each of the frequency bands 108A-108D as the channel quality experienced by each of the remote devices 104A-104D changes. Relatively slight increases in the channel quality experienced by a remote device make it possible to substantially increase the frequency range in the frequency band provided to that device, thereby providing a substantial increase in data transfer rate. The increase in data transfer rate may suitably be achieved by adjusting the coding method used to carry information as bandwidth increases or decreases. As bandwidth increases, a larger constellation of symbols is used, while a smaller constellation is used as bandwidth decreases. Coding systems typically employ symbols to carry information combined with error correction information, and the selection of a symbol from a larger constellation conveys more information because more possibilities are excluded when the larger constellation is used. Symbols chosen from a larger constellation typically comprise more bits than symbols chosen from a smaller constellation, because a larger number of bits is required to define the symbol. For example, a minimum of two bits is required to define a symbol that is one of a set of four, while a minimum of three bits is required to define a symbol that is one of a set of eight. Increasing the bandwidth increases the rate at which bits can be transmitted, and allows for the transmission of more complex symbols in a given time.

Figure 2:
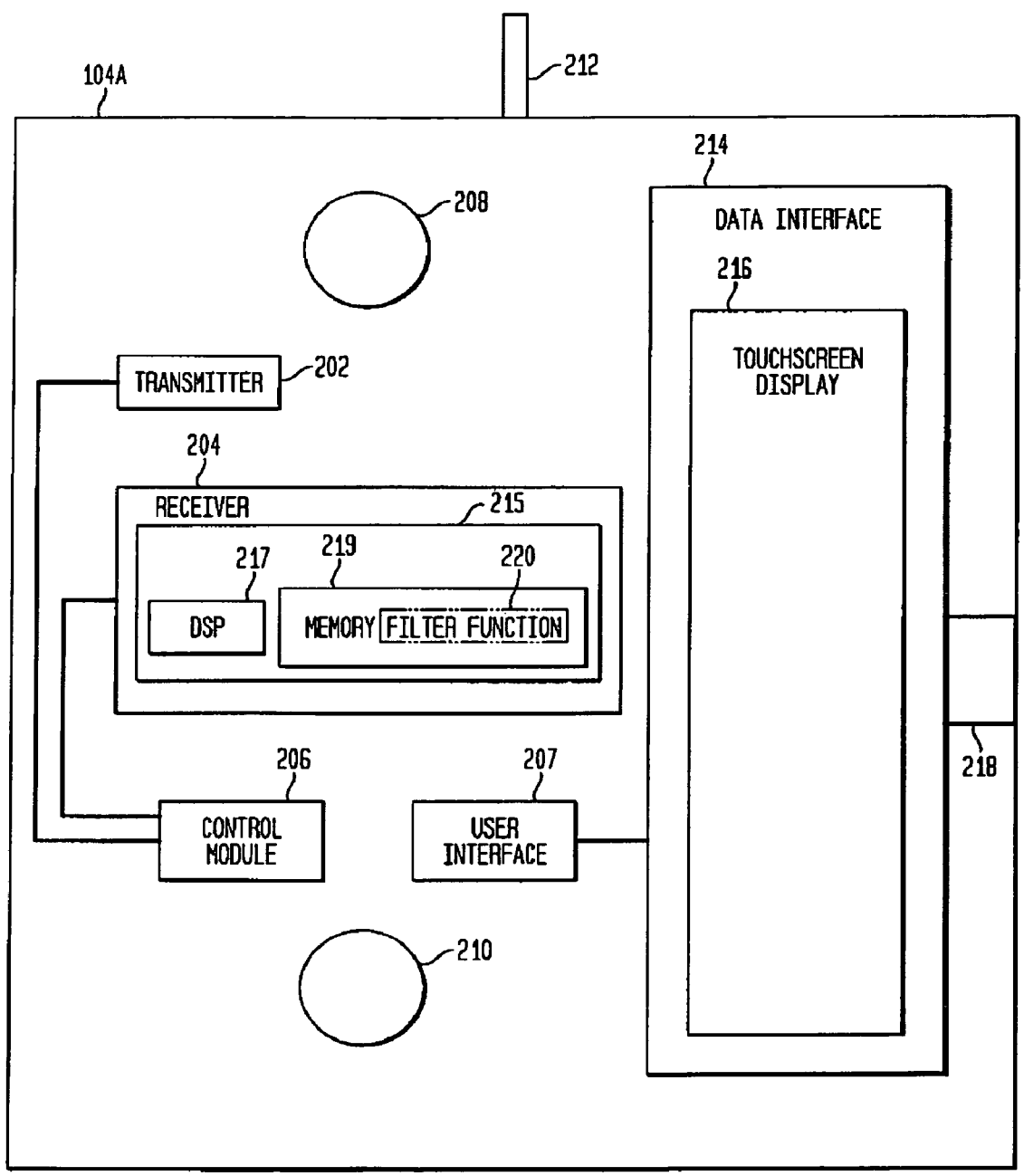
FIG. 2 illustrates a remote device according to an aspect of the present invention.

FIG. 2 illustrates additional details of the remote device 104A. The remote devices 104B-104D are similar, but are not shown here in order to avoid duplication. The remote device 104A includes a transmitter 202, a receiver 204, a control module 206, a user control interface 207, a speaker 208, a microphone 210 and an antenna 212. The remote device 104A may also include a data interface 214. The data interface 214 may suitably include a touchscreen display 216, to allow data to be entered by or displayed to the user, as well as a data port 218, to allow connection to an external data processing device such as a personal computer or organizer that does not itself have wireless communication capability but can use the remote device 104A for wireless communication.

The remote device 104A may suitably be designed for use in voice communication, data communication or both. If the remote device 104A is to be used for both voice and data communication, the speaker 208, microphone 210 and data interface 214 are present. If the remote device 104A is to be used only for voice communication, the data interface 214 need not be present, and if the remote device 104A is to be used only for data communication, the speaker 208 and the microphone 210 need not be present.

The remote device 104A uses the transmitter 202 and the receiver 204 to communicate with the base station 102. The base station 102 sends signals to the remote device 104A over the frequency band 108A. The remote device 104A uses the receiver 204 to detect and interpret these signals. The signals suitably include communication signals which may be converted to voice and data outputs by the user interface 207, and control signals which may be used by the control module 206 to control the operation of the remote device 104A. The remote device 104A employs the transmitter to transmit voice, data and status signals that are received and interpreted by the base station 102.

As noted above, the remote device 104A communicates with the base station 102 over the frequency band 108A. Depending on the quality of the communication channel experienced by the remote device 104A, suitably measured in terms of the propagation loss experienced by the device 104A, the frequency band 108A is narrowed or widened. That is, the range of frequencies comprising the frequency band 108A is increased or decreased. The receiver 204 includes a receiver control module 215, suitably comprising a digital signal processor 217 and memory 219. The receiver control module 215 suitably implements a variable filtering function 220, specifying the range of frequencies to be admitted for processing by the receiver 204. The receiver control module 215 sets a frequency range based on commands received from the control module 206. The control module 206 specifies the frequency range based on signals received from the base station 102. As will be discussed below in connection with FIG. 3, the base station 102 sets the frequency range based on the desired bandwidth for the frequency band 108A.

The control module 206 senses the power transmitted by the transmitter 202 and received by the receiver 204, and computes the propagation loss experienced by the transmitter 202 and the receiver 204. The control module prepares an indicator showing the propagation loss, or more generally the channel quality. The channel quality may be evaluated, for example, in terms of the signal to noise ratio. As noted above, the term "noise," when used herein, is defined to include both noise and interference. The indicator showing the propagation loss or channel quality is relayed to the transmitter 202. The transmitter sends the indicator to the base station 102 as part of its transmissions. As will be discussed further below in connection with FIG. 3, the base station 102 interprets the indicator received from the transmitter 202, sets a frequency range for the frequency band 108A, adjusts its own reception and transmission, and prepares a control signal for transmission to the remote device 104A. The control signal commands the remote device 104A to adjust its transmission and reception to the frequency range for the frequency band 108A. Upon receiving the control signal, the control module 206 issues a command to the receiver control module 215, directing the receiver control module 215 to adjust the filter function 220 so that the receiver 204 detects and interprets signals within the frequency range encompassed by the frequency band 108A. In addition, the control module 206 adjusts the transmitter 202 so that the transmitter employs a proper frequency range for the frequency band 108A. The transmitter may employ a variety of methods to exploit the selected frequency band. For example, because bandwidth is inversely proportional to symbol rate, the symbol rate may be adjusted. Alternatively, the transmitter may use a varying number of discrete tones, as is commonly done in orthogonal frequency division multiplexing (OFDM) systems.

Figure 3:
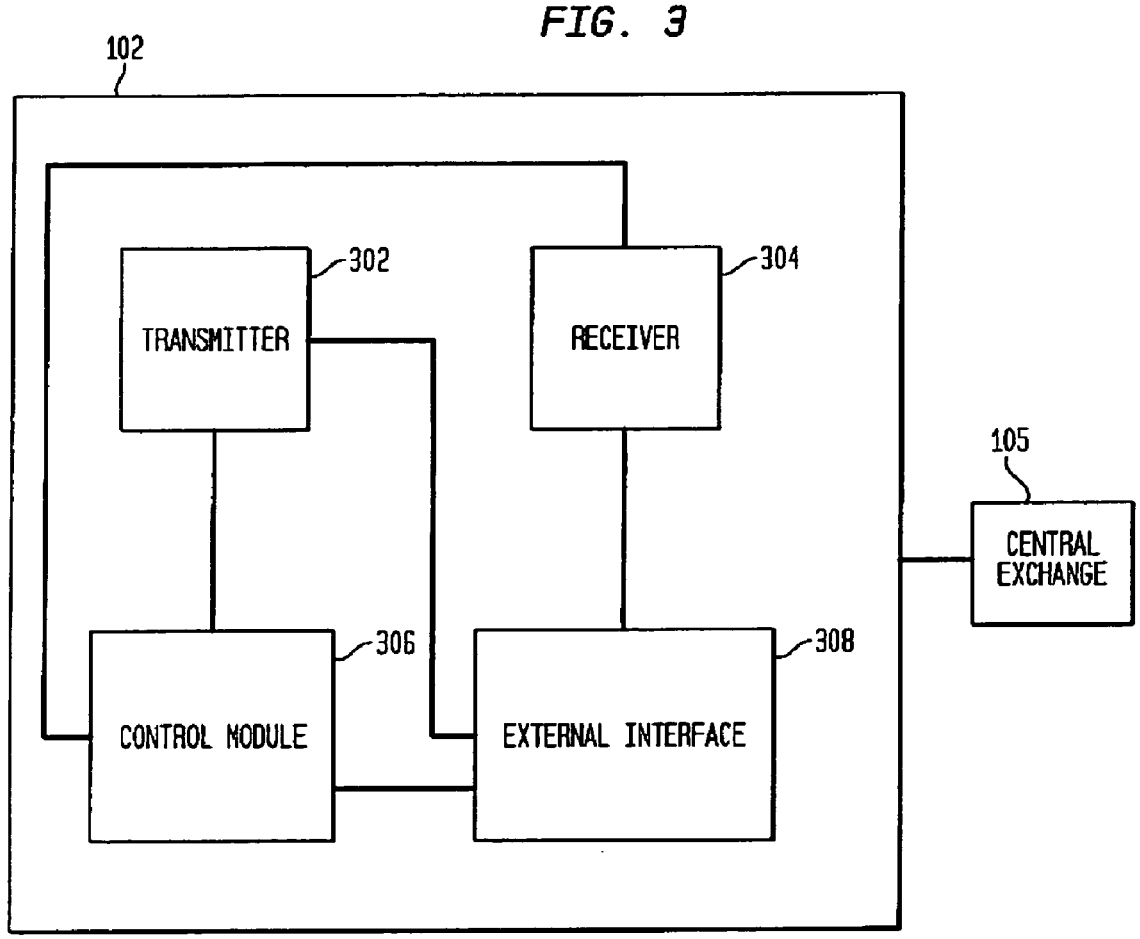
FIG. 3 illustrates a base station according to an aspect of the present invention.

FIG. 3 illustrates additional details of the base station 102. The base station 102 includes a transmitter 302, a receiver 304 and a control module 306. The transmitter 302 transmits signals to the remote devices 104A-104D and the receiver 304 receives signals transmitted from the remote devices 104A-104D. The base station 102 also includes an external interface 308, for communicating with the central exchange 105.

The control module 306 manages the operation of the transmitter 302 and the receiver 304. In particular, the control module 306 monitors the quality of the channel as experienced by each of the remote devices 104A-104D and adjusts the frequency band allocated to each of the devices. The control module 306 may suitably prepare signals to be transmitted to the devices 104A-104D and relayed to control modules, such as the control module 206, in the devices 104A-104D. The control module 306 adjusts the frequency range of signals transmitted by the transmitter 302 to each of the devices 104A-104D. In addition, the control module 306 transmits control signals to each of the remote devices 104A-104D in order to control the transmitters and receivers within each of the remote devices 104A-104D.

The base station 102 receives signals from each of the remote devices 104A-104D. The signals from each of the remote devices 104A-104D may suitably include indicators showing the propagation loss or channel quality experienced by the remote device. The control module 306 interprets each of the indicators to determine the average quality of the communication channel as experienced by all of the remote devices 104A-104D and the quality of the communication channel as it is experienced by each of the remote devices 104A-104D. Alternatively, the base station may analyze the signals exchanged between the base station 102 and the remote devices 104A-104D in order to interpret characteristics, such as gain or error rate, indicating the signal to noise ratio, and therefore the quality of the communication channel. The control module 306 then sets parameters for communication between the base station 102 and each of the remote devices 104A-104D. The values of the parameters are set so as to maintain a high data transmission rate by allocating frequency ranges within the communication channel 107. The control module 306 directs adjustments by the transmitter 302, the receiver 304 and transmitters and receivers within the remote devices 104A-104D, for example the transmitter 202 and the receiver 204 of the remote device 104A. The adjustments may include adjustments to power and bandwidth characterizing communication over a frequency band used for communication between the base station 102 and a remote device. The adjustments to power and bandwidth may be chosen in order adapt the power and bandwidth to changes in channel quality experienced by a remote device. The control module 306 may adjust the bandwidth of the frequency band used for communication with each device, and the power level used for communication with that device, so that a constant signal to noise ratio is maintained. In this way, improvements in the quality of the communication channel, for example, a movement of a remote device to a more favorable location, results in an increase in bandwidth with a proportional increase in the maximum possible data transmission rate.

The control module 306 prepares frequency control signals for each of the remote devices 104A-104D, for transmission by the transmitter 302. The frequency control signals set frequency ranges to be admitted by filters implemented by receivers within the remote devices 104A-104D. The filters may suitably be variable filters implemented using processing hardware such as digital signal processors. At the same time, the control module 306 sets frequency ranges for use by the transmitter 302, each frequency range to be used in communicating with one of the remote devices 104A-104D. The frequency ranges used by the transmitter 302 are the same frequency ranges admitted by the filters implemented by the remote devices 104A-104D.

In addition, the control module 306 prepares control signals to set frequency ranges to be used by transmitters within the remote devices 104A-104D. The frequency ranges are used to communicate with the receiver 304, and the receiver 304 is also set by the control module 306 to communicate with each of the remote devices 104A-104D using the frequency range matching that employed by the transmitter with which communication is being carried out. The frequency ranges may suitably be set so as to maintain a constant signal to noise ratio for communication with each device, or alternatively may be set so as to operate at one of many symbol rates depending on the bandwidth allowed by the communication channel quality for communication with the device. A higher quality for a communication channel will allow for an increased bandwidth, making possible the use of a faster symbol rate. If different symbol rates are to be used, the control signals sent to the remote devices will include indications of the symbol rates to be used.

Figure 4:
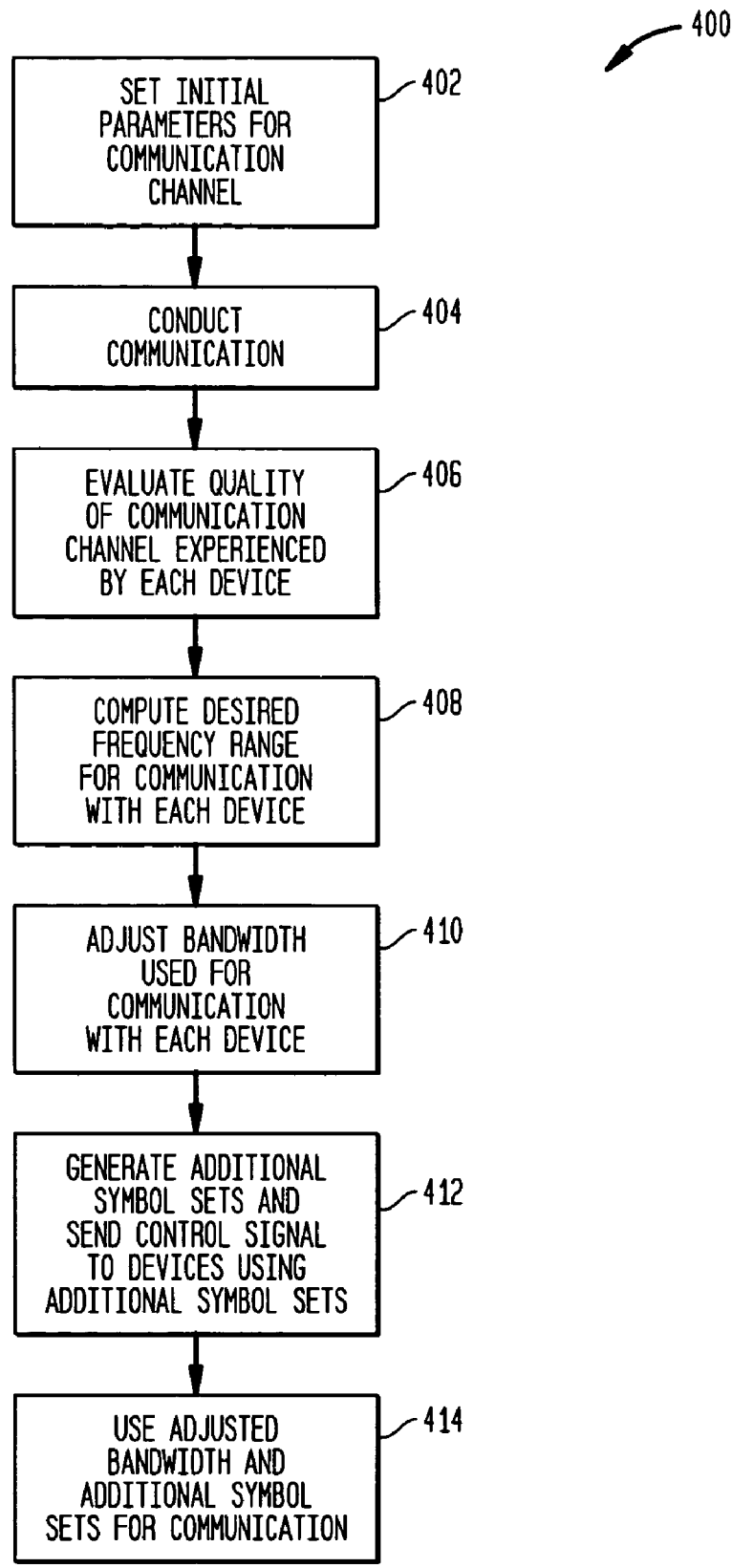
FIG. 4 illustrates a process of communication according to an aspect of the present invention.

FIG. 4 illustrates a process 400 of communication between a base station and a plurality of remote devices according to an aspect of the present invention. At step 402, a base station sets initial parameters for a communication channel comprising a set of frequency ranges, with each frequency range in the set being used for communication with a remote device. At step 404, communication is carried out between the base station and the remote devices. At step 406, the quality of the communication channel experienced by each of the remote devices is evaluated. The quality of the communication channel is suitably expressed in terms of the signal to noise ratio experienced by the remote device. At step 408, a desired frequency range for communication with each device is computed, with the desired frequency range for each device being chosen to optimize the communication rate between the base station and the remote device. The frequency ranges may suitably be set so as to maintain a constant signal to noise ratio for communication with each device, or alternatively may be set so as to operate at one of many symbol rates depending on the bandwidth allowed by the communication channel quality for communication with the device. A higher quality for a communication channel will allow for an increased bandwidth, making possible the use a faster symbol rate. At step 410, the bandwidth used for the frequency range for communication with each device is adjusted to optimize the communication rate between the base station and the remote device. The bandwidth is suitably adjusted by adjustment of a transmitter within the base station and sending of a control signal to the remote device in order to adjust the frequency used by a transmitter within the remote device and to adjust a filter used by a receiver within the remote device. At step 412, for each remote device with which additional symbol rates are to be used, the symbol sets are generated by the base station and a control signal is sent to each remote device indicating the additional symbol rates to be used. At step 414, communication is carried out using the adjusted bandwidths and additional symbol rates. Steps 406-414 are repeated at regular intervals during communication between the base station and the remote devices.

While the present invention has been disclosed in the context of various aspects of presently preferred embodiments, it will be recognized that the invention may be suitably applied to other environments consistent with the claims which follow.

I claim:

1. A communication system comprising:
   a central communication device;
   a plurality of remote devices communicating with the central communication device over a communication channel, a subset of said remote devices being initially allocated a frequency range within the communication channel, each of the remote devices in said subset being operative to transmit channel quality information to the central communication device describing the quality of the communication channel experienced by the remote device, the central communication device operating to increase the frequency range allocated to particular ones of the remote devices based on a determination of an improvement in the quality of the communication channel experienced by the devices on a device by device basis, and to send a frequency control signal to each remote device with an increased frequency range to control adjustment of a variable filter to adapt to the increased frequency range.

2. The communication system of claim 1, wherein the quality of the communication channel experienced by each remote device is determined based on a predetermined channel quality metric defining the channel quality experienced by the remote device.

3. The communication system of claim 2, wherein the predetermined channel quality metric is the signal to noise ratio experienced by the device.

4. The communication system of claim 3, wherein each of the remote devices determines the communication channel quality experienced by the remote device and transmits an indicator signal to the communication device, the indicator signal including a measurement of the channel quality.

5. The communication system of claim 4, wherein monitoring the quality is based on the indicator signal received from the remote device.

6. The communication system of claim 5, wherein the central communication device adjusts the frequency range of signals transmitted to each of the remote devices based on the indicator received from the device.

7. The communication system of claim 6, wherein the frequency range is adjusted so as to maintain a predetermined target signal to noise ratio for communication with each remote device, and wherein the predetermined signal to noise ratio is set according to a separate optimization procedure and may be the same for all remote devices or specific to each remote device.

8. The communication system of claim 7, wherein each of the remote devices adjusts its transmission and reception frequency using a variable filtering function.

9. The communication system of claim 8, wherein the central communication device is a base station.

10. A base station for communication with a plurality of remote devices, the base station comprising:
    a transmitter for transmitting signals to the remote devices;
    a receiver for receiving signals from each remote device, the signals received from each remote device including an indicator providing information about the quality of the communication channel experienced by the remote device; and
    a control module for controlling communication with the remote device, the control module being operative to adjust the frequency range used for communication with each remote device to increase the frequency range for remote devices experiencing an improvement in said quality and to adjust said transmitter to take advantage of said increased frequency range.

11. The base station of claim 10, wherein the control module prepares a control signal for transmission to each remote device, the control signal designating a frequency range to be used by the transmitter and receiver of the remote device.

12. The base station of claim 11, wherein the control module designates the frequency range to be used by the transmitter for transmission to each remote device.

13. The base station of claim 12, wherein the control module defines a modulation format, coding plan and rate for use in communicating with a remote device as the frequency range for communication with the remote device increases or decreases.

14. A remote device for communicating wit a base station, comprising:
    a variable frequency transmitter for transmitting signals to the base station in a dynamically changing variable frequency range;
    a receiver with a variable filter for receiving signals transmitted from the base station in a dynamically changing variable frequency range; and
    a control module for controlling communication with the base station, the control module being operative to sense the quality of the communication channel experienced by the remote device, to send an indicator to the base station indicating the quality of the communication channel and to adjust the variable frequency ranges of the transmitter and the receiver based on a control signal received from the base station.

15. A method of communication between a base station and a plurality of remote devices, comprising:
    conducting communication between the base station and the remote devices;

sensing the quality of a communication channel experienced by each of the remote devices; and adjusting a frequency range used for communication with each of the remote devices based on the quality of the communication channel experienced by the remote device to dynamically increase the frequency range for remote devices experiencing an improvement in said quality.

16. The method of claim 15, wherein the frequency range used for communication with each remote device is adjusted so as to attain a predetermined signal to noise ratio for communication with each remote device.

17. The base station of claim 10 wherein said control module further operates to adjust a coding method used for coding said signal to take advantage of said increased frequency range.

18. The base station of claim 10 wherein said control module further operates to adjust a coding method used for coding said signal to employ a larger constellation of code symbols.

19. The base station of claim 10 wherein said control module further operates to adjust said receiver to receive signals in an adjusted frequency range.

* * * * *